United States Patent
Mizushima et al.

(10) Patent No.: US 7,385,893 B2
(45) Date of Patent: Jun. 10, 2008

(54) METHOD FOR FORMING MARKS ON WRITE-ONCE MEDIUM THAN APPLYING SECOND BEAM WITH POWER LEVEL LOWER THAN READ POWER SET FOR A PREDETERMINED TIME

(75) Inventors: Tetsuro Mizushima, Tokyo (JP); Koji Mishima, Tokyo (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 720 days.

(21) Appl. No.: 10/499,878

(22) PCT Filed: Dec. 6, 2002

(86) PCT No.: PCT/JP02/12833

§ 371 (c)(1),
(2), (4) Date: Jun. 24, 2004

(87) PCT Pub. No.: WO03/058611

PCT Pub. Date: Jul. 17, 2003

(65) Prior Publication Data

US 2005/0018589 A1    Jan. 27, 2005

(30) Foreign Application Priority Data

Dec. 28, 2001   (JP)   ............................ 2001-401109

(51) Int. Cl.
*G11B 7/125*   (2006.01)
(52) U.S. Cl. .................... 369/47.53; 369/59.12
(58) Field of Classification Search ............. 369/47.53, 369/59.12
See application file for complete search history.

(56) References Cited

U.S. PATENT DOCUMENTS 5,530,688 A  *  6/1996  Hurst et al. .................. 369/116
5,544,137 A  *  8/1996  Ohara et al. ................ 369/47.5

(Continued)

FOREIGN PATENT DOCUMENTS

JP        B2 4-838        1/1992

(Continued)

OTHER PUBLICATIONS

Kato et al. "The Phase Change Optical Disc With the Data Recording Rate of 140Mbps," International Symposium on Optical Memory, 2001, pp. 200-201.

*Primary Examiner*—Gautam R. Patel
(74) *Attorney, Agent, or Firm*—Oliff & Berridge, PLC (57) ABSTRACT

A write-once high density optical recording medium capable of a high speed recording that effectively forms space between recording marks. A recording layer 18 of a high speed write-once optical recording medium 10 is formed by laminating a first sub recording layer 18A and a second sub recording layer 18B each containing a metal as its main component. When the recording layer (laminated recording layer) 18 is irradiated with a laser beam, the main component metals contained in the first and second sub recording layers 18A, 18B diffuse and are mixed together by means of the irradiation, thereby forming recording marks whose reflectance have been irreversibly changed due to such mixing. At this time, after an irradiation using a laser beam for forming recording marks, a power level P1 lower than a read power is maintained for a predetermined time Ti.

8 Claims, 3 Drawing Sheets

U.S. PATENT DOCUMENTS

| | | | |
|---|---|---|---|
| 5,732,062 A | 3/1998 | Yokoi et al. | |
| 5,848,045 A * | 12/1998 | Kirino et al. | 369/47.53 |
| 6,033,752 A | 3/2000 | Suzuki et al. | |
| 6,115,338 A * | 9/2000 | Masaki et al. | 369/47.52 |
| 6,680,888 B2 * | 1/2004 | Toda et al. | 369/47.51 |

FOREIGN PATENT DOCUMENTS

| | | |
|---|---|---|
| JP | A 9-7176 | 1/1997 |
| JP | A 11-232680 | 8/1999 |
| JP | A 2000/222764 | 8/2000 |
| WO | WO 00/25308 | 5/2000 |

* cited by examiner

METHOD FOR FORMING MARKS ON WRITE-ONCE MEDIUM THAN APPLYING SECOND BEAM WITH POWER LEVEL LOWER THAN READ POWER SET FOR A PREDETERMINED TIME

TECHNICAL FIELD

The present invention relates to a write-once optical recording medium and a recording method for the write-once optical recording medium.

BACKGROUND ART

Now, in the market of optical recording medium there have been distributed rewritable optical recording media and so-called write-once optical recording media which are not rewritable. A rewritable optical recording medium, as meant by the word "rewritable," allows data to be written therein again and again, so that it is possible for the same optical recording medium to be used repeatedly in recording only required data. On the other hand, a write-once optical recording medium is not rewritable and thus characterized by a feature that "data will never be altered," thereby making itself useful in data distribution, storage, or backup.

Conventionally, as a recording structure of a write-once optical recording medium, it has been suggested that organic dyes is applied to a substrate. However, such a recording structure has been found insufficient in its recording sensitivity when performing a high speed recording. Furthermore, if the wavelength of a laser beam is made short in order to increase a recording density, there will be a problem that it is difficult to synthesize dyes which can be used with laser beams having wavelengths equal to or shorter than that of a blue light.

Although there have been several suggestions (for example, Japanese Patent Publication No. 1992-838, etc.) that recording layer can be formed by an inorganic material, none of conventional structures is suitable for high density or high speed recording, their storage reliability of recorded state is inadequate, and their playback durability is insufficient.

For this reason, among various high density optical recording media using laser beams having wavelengths equal to or shorter than that of a blue light, what has been suggested as an optical recording medium capable of "high speed recording" is only a rewritable (RW) optical recording medium formed by using a phase-change material.

Recently, in the field of optical recording media for use as a multimedia-compatible medium, there has been a demand for a higher density and higher speed recording. Similarly, the same demand is existing in the field of write-once optical recording media.

With regard to a rewritable optical recording medium, it is necessary to strictly control several time-related factors such as cooling speed, with the recording strategy becoming more complex because of high speed and high density recording. On the other hand, a write-once optical recording medium has a recording strategy which was not as complex as a rewritable optical recording medium. However, in view of a further higher density and further high speed recording, what has been clearly understood is that it is impossible to obtain sufficient characteristics by a recording strategy using a conventional write-once optical recording medium. Here, the recording strategy means a power control pattern of a recording laser beam. Generally speaking, a recording laser beam (especially when a recording is performed on an optical recording medium using a phase-change material) is not continuously irradiated corresponding to the length of recording mark. In contrast, as described in Japanese Patent Laid-Open Publication No. 1997-7176, for the purpose of controlling the shape of recording mark, a general practice is to irradiate a laser beam formed by a pulse train consisting of a plurality of pulses, with the width of each pulse in the pulse train strictly controlled. At this time, detailed arrangement of pulse dividing is usually designated to as recording strategy.

DISCLOSURE OF THE INVENTION

The present invention has been accomplished in order to solve the above-described problems existing in conventional recording media. It is an object of the invention to provide a write-once optical recording medium capable of maintaining spaces between recording marks at clean non-recorded portions, and a recording method for the write-once optical recording medium.

The above-mentioned object can be achieved by inventions indicated in the following (1) to (9).

(1) 1. A recording method for a write-once optical recording medium, characterized in that: a laminated recording layer containing at least two sub recording layers is provided, each sub recording layer containing one kind of metal as its main component; a laser beam is irradiated onto the laminated recording layer, so that the main component metals contained in the respective sub recording layers are diffused and mixed; the laminated recording layer is changed to a single layer through the mixing to be recordable a recording mark whose reflectance is irreversibly changed; and after a laser beam having a predetermined write power Pw for forming the recording mark is irradiated, another laser beam having a power level P1 lower than a read power Pr set for reading the recording mark is irradiated for a predetermined time.

(2). The recording method for a write-once optical recording medium, according to (1), wherein a laser beam having a power level P2 higher than the read power Pr and lower than the write power Pw is irradiated, before the followed by performing another irradiation using the predetermined write power Pw for forming the recording mark.

(3). The recording method for a write-once optical recording medium according to (1), wherein after the laser beam having the power level P1 lower than the read power Pr is irradiated, a laser beam having a power level P2 higher than the read power Pr and lower than the write power Pw is further irradiated.

(4). The recording method for a write-once optical recording medium according to any one of (1) to (3), wherein at least a length of a shortest recording mark among the recording marks is less than 0.35 times the spot diameter of the laser beam.

(5). The recording method for a write-once optical recording medium according to any one of (1) to (4), wherein at least a width of the shortest recording mark among recording marks is 0.7 times or more the length of the shortest mark.

(6). The recording method for a write-once optical recording medium according to any one of (1) to (5), wherein a wavelength of the laser beam is set within a range of 200 to 450 nm.

(7). A write-once optical recording medium, comprising a laminated recording layer containing at least two sub recording layers each containing one kind of metal as its main component, wherein the laminated recording layer with is irradiated with a laser beam having a predetermined recording strategy so that the main component metals contained in the respective sub recording layers are diffused and mixed together to form a single layer, in order to be recordable recording marks whose reflectance are irreversibly changed, and the recording strategy comprises a configuration such that a laser beam having a write power Pw is irradiated for forming a certain recording mark, and then another laser beam having a power level P1 lower than a read power Pr set for reading recording marks is irradiated for a predetermined time.

(8). The write-once optical recording medium according to (7), wherein the laminated recording layer comprises two sub recording layers, one of which contains as its main component metal one element selected from the group comprising Al, Ag, Au, and Cu.

(9). A write-once optical recording medium characterized in that: the medium is to be irradiated with a laser beam having a wavelength of 450 nm or shorter in accordance with a predetermined recording strategy at a recording transfer rate of 35 Mbps or higher, thereby forming a recording mark, wherein the predetermined recording strategy comprises a configuration such that before a laser beam having a write power Pw is irradiated, a laser beam having a power level P2 higher than a read power Pr set for reading a recording mark and lower than a write power Pw for forming a certain recording mark is irradiated.

(10). The write-once optical recording medium according to any one of (7) to (9), wherein at least a length of a shortest recording mark among the recording marks is less than 0.35 times the spot diameter of the laser beam.

The technical summery of the present invention will be explained as follows.

An optical recording medium to which the present invention is applied has a laminated recording layer of a structure basically formed by laminating at least two sub recording layers. Each sub recording layer contains one kind of metal as its main component. Once the laminated recording layer is irradiated with a laser beam, the main component metals contained in the respective sub recording layers are diffused and mixed together in an irradiated area.

Recording marks formed by the diffusion and mixing reaction of the respective main component metals are extremely stable due to a single layer structure, and its reflectance has been irreversibly changed. Thus, the change of the reflectance can be caught as information, and such a recording mark after recording is not likely to change, even if the recording medium is stored or played-back in an environment of an elevated temperature.

The formation of the recording mark can be effected only by a heat amount control which can ensure progression of a predetermined diffusion and mixing of the main component metals in the sub recording layers basically by means of an irradiation using a laser beam. Accordingly, even in relation to a high speed recording, it is still possible to carry out a flexible treatment by adjusting the heat amount control.

Consequently, although at a low cost, it is possible to perform a high density recording at a high speed, thereby obtaining an optical recording medium suitable for use as a multimedia-compatible medium.

Particularly, in the present invention, after a laser beam having a predetermined write power Pw for forming the recording mark is irradiated, another laser beam having a power level P1 lower than the read power Pr is irradiated. As a result, it becomes possible to prevent some problems that are likely to occur when performing a high density recording at a high speed, particularly to effectively prevent a problem that a heat of a laser beam excessively remains at the terminal of a long recording mark, and such a remaining heat makes it impossible to clearly form a space (a portion in which any recording mark is not formed) until a next recording mark.

Moreover, by forming an arrangement of performing an irradiation using a laser beam having a power P2 higher than a read power and lower than a write power, it is possible to compensate for a recording sensitivity decrease occurring during a high speed recording. In particular, as will be described later, it is possible to solve the recording density decrease occurring when shortening the pulse length at the time of forming the shortest recording mark in order to achieve a high density recording.

Furthermore, although the present invention can obtain the above effects most remarkably when the present invention is applied to an optical recording media which has the laminated recording layer including at least two sub recording layers, a concept of the present invention itself is applicable to all kind of optical recording media.

BEST MODE FOR CARRYING OUT THE INVENTION

An embodiment of the present invention will be described in detail with reference to the accompanying drawings.

Figure 1:
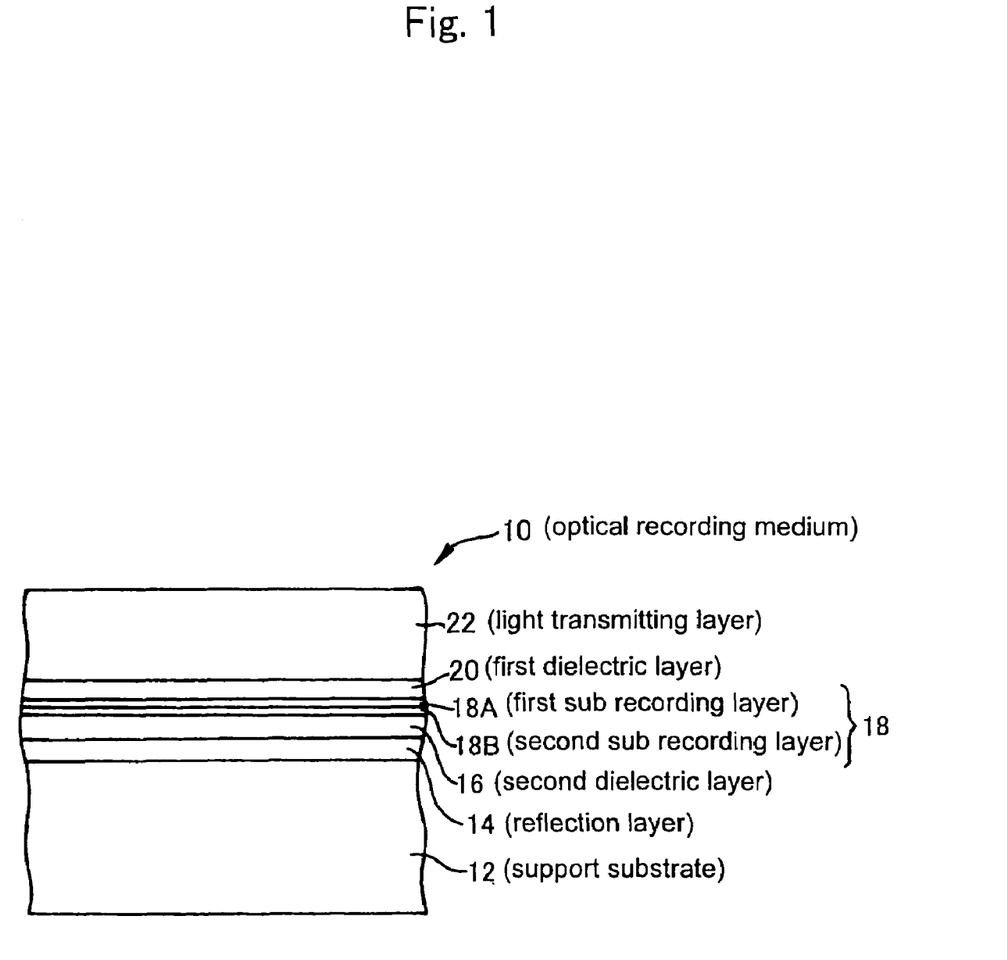
FIG. 1 is an enlarged cross sectional view schematically showing a high-speed write-once optical recording medium according to an embodiment of the present invention.

As shown in FIG. 1, a high-speed high-density write-once optical recording medium (hereinafter referred to as optical recording medium) 10 to which the present invention is applied is formed by successively forming, on a support substrate 12, a reflection layer 14, a second dielectric layer 16, a recording layer (laminated recording layer) 18, a first dielectric layer 20, and a light transmitting cover layer 22. A blue laser beam having a wavelength of 405 nm, for example, is emitted by a recording laser beam source 24 to irradiate the above-mentioned recording layer 18 through the light transmitting cover layer 22, thereby changing the reflectance of an irradiated area and using the irradiated area as a recording mark.

Preferably, at least one of the sub recording layers forming the recording layer 18 contains, as its main component metal, at least one of high reflectance metals including Al, Ag, Au, and Cu etc. In detail, it is allowed to use Al—Sb, Al—Ca, Al—Ce, Al—La, Al—Se, Au—Ce, Au—La, Au—Si, Au—Ge, Si—Cu, Ge—Cu, etc.

Particularly, since Al and Ag exhibit high reflectivity even with a laser beam having a wavelength equal to or shorter than that of blue light, it is easy to adjust the reflectance by changing the thickness of sub recording layers. Further, it is possible to set the reflectance of a non-recorded portion at a value higher than the reflectance of a portion in which recording mark has been formed, thus providing a more preferable result.

Moreover, it is more preferable to form an inter-metallic compound having a melting point higher than either any one of the sub recording layers or any one of the above main component metals.

When a blue laser beam is used as a recording beam to irradiate the recording layer 18, the main component metals contained in first and second sub recording layers 18A and 18B will diffuse and are thus mixed together in an irradiated area, thereby producing a reaction product which is a single layer formed by such a mixing. Further, such a reaction product changes the reflectance of the irradiated area, thus forming recording mark which can be recognized. In this way, since the above reaction involving diffusion of the two main component metals as well as the mixing thereof is irreversible, the recording layer 18 can be used to perform write-once optical recording.

The thickness of the recording layer 18, which is an entire thickness including the first and second recording layers 18A and 18B, is set to be 3 to 50 nm, preferably 5 to 20 nm. Qualitatively, if the recording layer 18 (including sub recording layers 18A and 18B) is too thin, it will be difficult to ensure an adequate reflectance difference in a recording mark between a state before recording and a state after recording. On the other hand, if the recording layer 18 is too thick, a heat capacity will become large, hence reducing a recording sensitivity.

Accordingly, the thickness of the sub recording layers 18A and 18B should be appropriately set such that a high thermal stability can be obtained and recording mark having large reflectance difference can be formed. For example, when a sub-recording layer containing Al as its main component is combined with a sub-recording layer containing Sb as its main component, it is allowed to consider that an inter-metallic compound will be formed by combining Al with Sb at a ratio of 1:1. Therefore, it is preferable to set the thickness of each sub-recording layer in a manner such that a ratio (atomic ratio) of Al to Sb in the recording layer 18 will not deviate greatly from 1:1.

The first and second dielectric layers 20, 16 may be formed by various dielectric materials including an oxide, a sulfide, a nitride, a fluoride, and a carbide, or mixtures thereof. In the present embodiment, the first and second dielectric layers 20, 16 are all formed through sputtering using $ZnS-SiO_2$ target ($ZnS$: 80 mol %, $SiO_2$: 20 mol %).

The first dielectric layer 20 has a thickness of 5 to 200 nm and is provided to cooperate with the second dielectric layer 16 so that the recording layer 18 can be interposed between the two dielectric layers. Here, the second dielectric layer 16 has a thickness of 5 to 200 nm and is provided on the reflection layer 14.

The first and second dielectric layers 20, 16 also serve to protect the recording layer 18 from vapor or other gases. Further, by adjusting the thickness of these dielectric layers, it is possible to interfere the laser beam by the adjusted thickness, and to adjust the reflectance of non-recorded portion of the recording layer 18, as well as to further increase a reflectance difference between a state before recording and a state after recording.

The support substrate 12 comprises a polycarbonate plate having a thickness of 1.1 mm.

Moreover, the reflection layer 14 is for example a silver alloy layer having a thickness of 10-200 nm, which is formed on the support substrate by means of sputtering or the like. When viewed from the incident side of the laser beam, such reflection layer 14 is located inwardly of the recording layer 18. By providing a returning beam to the recording layer 18, it is possible to increase the reflectance difference between a state before recording and a state after recording, as well as to improve a recording sensitivity because of the reflection layer 14. Specifically, the reflection layer 14 is formed by a metal (including metalloid) film or a dielectric multi-layer film. In the present embodiment, the reflection layer 14 is formed by an alloy which is AgPdCu, having a thickness of 100 nm and containing silver as its main component. However, such a reflection layer 14 is not absolutely indispensable.

The light transmitting cover layer 22 is formed by spin-coating the first dielectric layer 20, or formed by bonding thereon a sheet-like material shaped in advance, such as an ultraviolet setting resin layer or a polycarbonate sheet. The thickness of the light transmitting cover layer 22, or an entire thickness including the cover layer 22 and the first dielectric layer 20, should be selected such that when the numerical aperture (NA) of an objective lens 26 at the time of irradiating the recording layer 18 with a blue laser beam having a wavelength of 405 nm is set at 0.85, the blue laser beam can be converged on the recording layer 18. In the present embodiment, such an entire thickness is set at 100 μm.

Specifically, the optical recording medium 10 of the present embodiment is characterized in that if the recording layer 18 comprises a first sub recording layer 18A containing Al as its main component and a second sub recording layer 18B containing Sb as its main component, the thermal stability (namely, thermal stability after recording) of reaction product in recording mark formed on the recording layer 18 will be higher than a thermal stability (namely, thermal stability before recording) when the first and second sub recording layers 18A, 18B are simply laminated on non-recorded portion.

In more detail, during an irradiation using a laser beam, the main component metals contained in the first and second sub recording layers 18A and 18B will diffuse respectively and be mixed together, thereby forming an inter-metallic compound. On the other hand, even if an inter-metallic compound is not formed, it is allowed to consider that at least the main component metals will be combined with each other, thus forming a mixture. Thus, since a reaction product formed by such a mixing can irreversibly alter the reflectance of an irradiated area, it is allowed to make use of the reflectance variation as a recording mark.

The melting point of Al is 660° C. and the melting point of Sb is 631° C. Namely, both of them have melting points considerably higher than 500° C. and have sufficient thermal stability when existing as simple substance, and can be fused upon being irradiated by a laser beam. Further, by means of a reaction between Sb and Al, it is possible to form a stable inter-metallic compound AlSb (melting point: 1060° C.) whose melting point is sufficiently higher than that of each respective simple substance and whose crystal structure will not change either at a low temperature or at an elevated temperature. On the other hand, an inter-metallic compound such as AlSb is not necessary to be in crystal growth, and is capable of recording even in a microcrystal state which can not be detected by an electron ray diffraction.

Upon catching the above facts as phenomenon, when the recording layer 18 is irradiated with a laser beam having a write power Pw capable of forming recording mark, the following facts can be confirmed: A) in some areas of the recording layer 18 in which mixing has not occurred, such mixing will thus occur and reflectance will be changed (recording becomes possible), B) in other areas in which recording marks have already been formed, reflectance will not be changed even if these areas are irradiated by the recording beam, thereby providing ideal characteristics as write-once type.

Therefore, the optical recording medium 10 is such that its recording marks comprising the above-mentioned reaction product are not easy to change and they are stable even if the recording medium is stored in a high temperature environment after recording. Further, the recording marks are not likely to change even if the recording medium is subject to a continuous playback, thereby exhibiting an excellent playback durability. Moreover, even if the reflectance after formation of recording marks is set to be low and light absorption rate after formation of recording marks is set to be high, since the thermal stability of recording marks is high, the recording medium will not get deteriorated by an irradiation of a playback laser beam.

Moreover, since the thermal stability of recording marks is high, a phenomenon of accidentally erasing the recording marks in an adjacent track (cross erase) at the time of recording can be substantially prevented. In this way, since it is possible to make narrow the pitch of recording tracks, such an optical recording medium can be effectively used in high density recording (this will be described later).

Figure 2:
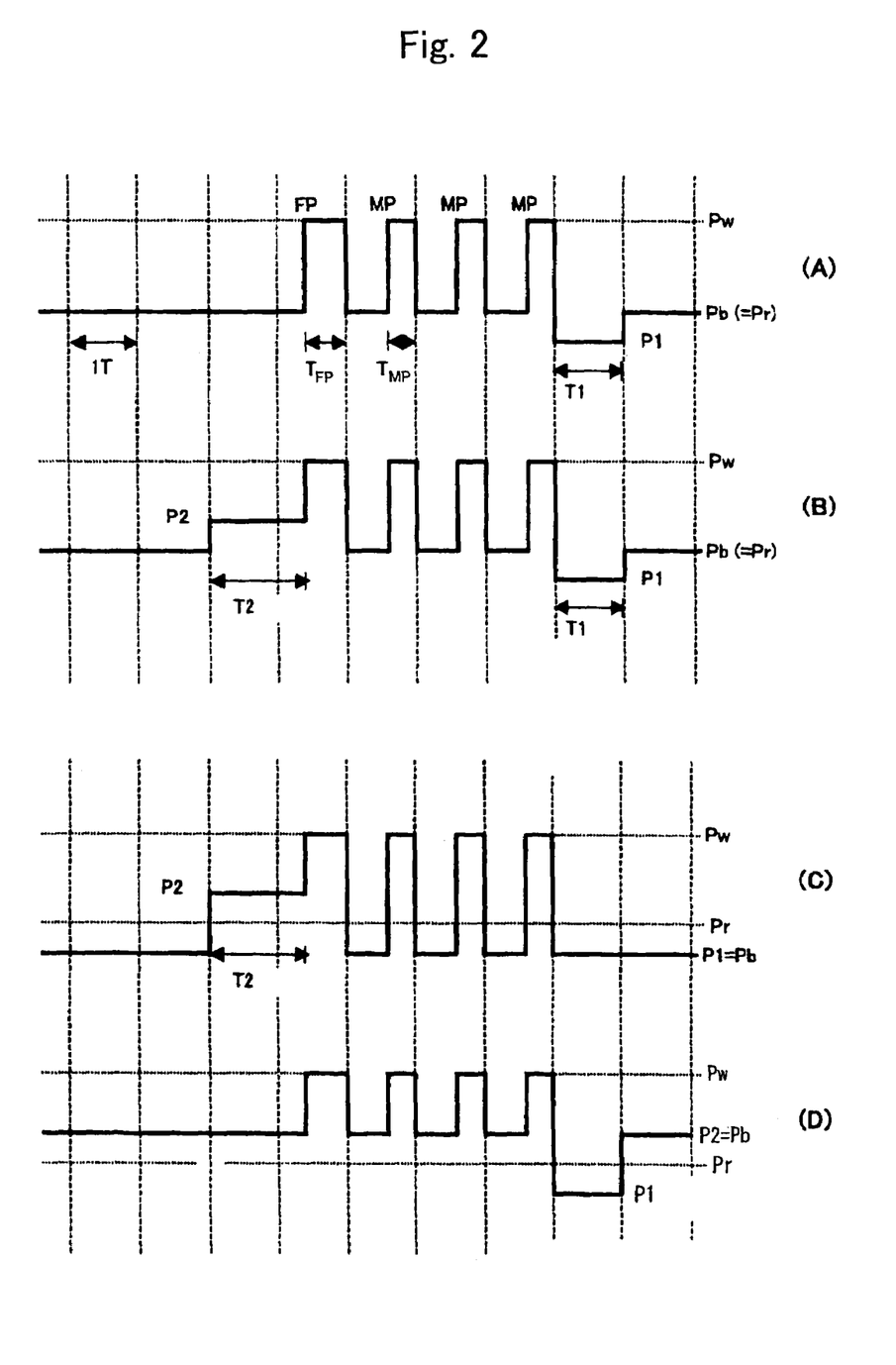
FIG. 2 is a pulse waveform graph showing an example of a recording strategy at the time recording marks are being formed on the above-mentioned high-speed write-once optical recording medium.

FIG. 2 shows examples of recording strategies for forming recording marks. Particularly, FIG. 2 shows examples of forming relatively long recording marks R. However, the examples shown in FIG. 2 have exaggerated a qualitative concept, so that the size, number and maintaining time of the respective pulses will not be necessarily the same as actually measured.

FIG. 2(A) shows one of the most fundamental examples of the present embodiment. In this example, as a strategy at the time of recording, a switching arrangement having a write power Pw and a bias power Pb is used as a basic arrangement. Then, after a laser beam having a predetermined write power Pw (FP and three MPs shown in the example) has irradiated for forming recording marks R, a laser beam having a power level P1 lower than a read power (a laser power set for reading recording marks R) Pr is allowed to irradiate for a predetermined time T1, thus forming an additional arrangement.

When a high density recording is performed and a recording transfer rate is high, a heat of laser beam will excessively remain near the terminals of particularly long recording marks R. Because of such remaining heat, the rear portions of the recording marks will form into tail-like areas, and the edge of rear portion of each mark is likely to form into a slackened portion. At this time, there will be a problem that mark portion enters a space until a next recording mark and thus the space can not be clearly formed. Especially, when mark edge recording is performed, since a boundary between a mark and a space is not clear, a jitter value of each signal will get deteriorated and an error is likely to occur.

On the other hand, since a power level P1 lower than a read power Pr is maintained for a predetermined time T1 in the last portion of recording mark formation, it is possible to prevent the occurrence of the above problem.

By using such a strategy, it is possible to obtain a write-once optical recording medium whose shortest mark (space) length is 0.35 with respect to a spot diameter (provided as a laser wavelength λ/lens numerical aperture NA), thus allowing a high density recording. In detail, when the laser wavelength is 405 nm and the lens numerical aperture is 0.85, the shortest mark length will be less than 167 nm.

An appropriate range of the maintaining time T1 of the power level P1 is 0.2 to 1.0 times the passing time of the shortest mark (space) length, preferably 0.3 to 0.8 times the passing time. However, it is also allowable to make the bias power Pb equal to the power level P1, and to make the maintaining time T1 equal to or longer than the length of the longest space.

Specifically, an appropriate range of the power level P1 is from the critical value of track trace to 0.4 mW. Since the critical value of track trace is 0.08 mW at present time, it is more preferable that 0.1 mW to 0.3 mW becomes an optimum range at present time. In the future, if the trace capability of hard system has been improved, it is allowed to reduce the lower limit correspondingly.

FIG. 2(B) is based on the arrangement of FIG. 2(A). In order to form the above-mentioned recording marks, prior to an irradiation with a predetermined write power Pw, another irradiation is performed by using a laser beam having a power level P2 which is higher than the read power Pr and lower than the write power Pw. When recording is performed at a high speed, with regard to a laser beam rise time and a recording sensitivity, it is effective to set the laser power P2 higher than the read power Pr and to perform preheating. In particular, as in the present embodiment, when the power level P1 lower than the read power Pr is maintained after the formation of a recording mark, it is possible to satisfactorily form a rise portion of a next recording mark.

Here, although the power level P2 is higher than the read power Pr, it is set at a sufficiently lower value than the write power Pw. The purpose of such setting is to prevent the laser beam irradiation of the power level P2 from producing non-intended recording marks in non-recorded portions. In more detail, a range of 1.1 Pr to 0.4 Pw is suitable, with 1.2 Pr to 0.3 Pw being the best range.

Although the maintaining time T2 of the power level P2 is preferable to be set at 0.2 to 1.0 times the passing time of the shortest mark length, it is also allowed to be used as the power level of P2 immediately after irradiation of P1 (FIG. 2(D)).

As shown in FIG. 2(C) as well as in FIG. 2(B), it is also possible to have the bias power Pb at the time of forming recording marks to be coincident with the power level P1 (Pb P1).

FIG. 2(D) shows that when in FIG. 2(C) the bias power Pb at the time of forming recording marks is at a value slightly lower than the power level P2 (Pb is nearly equal to P2). In this way, it is possible to rectify the middle portion of each recording mark into a shape close to a straight line. Particularly, by setting the power level of Pb at a value equal to or slightly lower than P2, it is possible to set the write power at a low value, thereby compensating for a recording sensitivity decrease which is unfavorable for a high-speed recording.

In any of the above examples (A) to (D), with the same pattern of recording strategy being in use, it is substantially possible to handle a variable-speed recording simply by changing the frequency and the write power Pw. At this time, if the values of bias power Pb or power levels P1 and P2 are changed and set according to a recording transfer rate, it is possible to perform a further precise fine adjustment on recording marks R such that they will not become tear drop type or reverse tear drop type.

Particularly, in the case where recording is performed on a drive apparatus capable of performing a test-write on the recording medium 10 prior to recording information, during the test-writing, if the value of the bias power Pb, the maintaining time T1 of the power level P1 immediately after the formation of recording mark, and the maintaining time T2 of the power level P2 are adjusted, it is possible to obtain good recording characteristics at any recording transfer rate among 35 Mbps to 100 Mbps. However, it is also possible for time T1 and time T2 to be changed independently.

Figure 3:
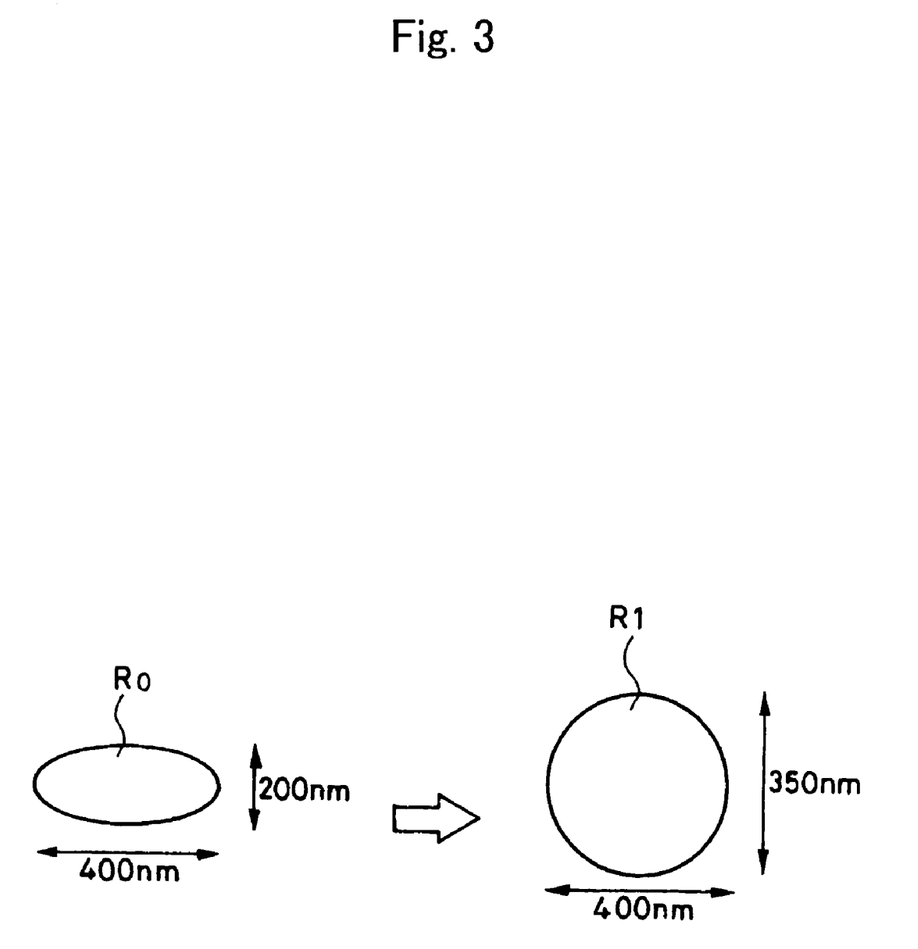
FIG. 3 is an explanatory view showing a comparison between a conventional method and a method of forming the shortest recording mark in the above-mentioned embodiment.

Incidentally, in the present embodiment, as shown in FIG. 3, the shape of the shortest recording mark R1 is not set to be an elliptical mark like a conventional recording mark Ro, but has a shape close to a true circle. Here, FIG. 3 shows as reference some examples indicating the sizes of recording marks of DVD-Rs.

In the case of a write-once optical recording medium using conventional dyes, since it is necessary to form the recording mark Ro accompanying deformation of groove section, it was not allowed to record the recording mark Ro beyond groove so as to avoid signal distortion. For this reason, in order to obtain playback signals having a certain dimension under a condition in which the width (in radial direction) of the recording mark Ro is limited, it was absolutely necessary to form the elliptical shape having a corresponding length in the circumferential direction. However, with regard to the optical recording medium 10, as described above, since it is possible to avoid groove section deformation when forming recording mark R1, and since the result is signal amplification even under a condition in which recording is performed beyond group section, no trouble would occur even if recording has been done beyond groove section.

For this reason, even in the case where track pitch is narrowed and group width is reduced for high density recording, it is possible for the shortest mark to be formed into a shape close to a true circle, and for its width to be 0.7 times or more, preferably 0.8 times or more the length of the shortest mark, which was only 0.5 (times) the length of the shortest mark in prior art.

In order to make the shortest recording mark to be close to a true circle, the write power is increased and the pulse width is reduced. In more detail, although an irradiation was usually conducted with a laser pulse having the write power Pw, in a range of 0.3 to 0.7 times the passing time of the shortest mark length, the present embodiment is such that the laser irradiation is conducted in a range of 0.05 to 0.3 times the passing time of the shortest mark length. In this way, as shown in FIG. 3, it is possible to obtain relatively large playback signal even if the lengths in the circumferential direction are the same, thereby improving CNR (carrier to noise ratio). Further, if the magnitude of playback signal is only required to be the same as prior art, it is possible to correspondingly realize a recording with a higher density.

Incidentally, when the write power is increased in order to make the shortest recording mark close to a true circle in this way, the above-described arrangement "an irradiation is conducted using a laser beam having a power level P1 set at a lower value than the read power Pr set at the time of reading recording mark" is effectively contributive to a clear formation of space. Further, another arrangement "prior to an irradiation using a predetermined write power Pw for forming recording marks, another irradiation is performed using a laser beam having a power level P2 higher the read power Pr but lower than the above-mentioned write power Pw" is effectively contributive to a compensation for a power shortage caused by a shortened pulse width. Of course, these arrangements may be adopted simultaneously.

The operation of a recording method for the optical recording medium 10 formed according to the present embodiment will be described as follows.

The formation of recording marks on the recording layer (laminated recording layer) 18 formed according to the present embodiment can be effected sufficiently only by performing a heat amount control for carrying out the predetermined diffusion and mixing among main component metals in sub recording layers basically by means of laser beam irradiation, thereby making it possible to perform a high speed recording with ease by adjusting the heat amount control. Further, since the laminated recording layer is formed by using metal materials having a high thermal conductivity, it is not necessary to worry about an influence from a large heat interference generated in the optical recording medium containing dye materials. Moreover, since it is possible to form each recording mark close to a true circle, it is possible to ensure high density recording.

Furthermore, by using the recording strategies shown in FIGS. 2(A) to 2(D), it is possible to clearly maintain an edge portion of mark/space and to compensate for a recording sensitivity decrease during a high speed recording, which would otherwise become a problem in realizing a high density during a high speed recording.

In this way, it becomes possible to realize a high speed and high density recording which was difficult with a write-once optical recording medium.

In particular, after an irradiation using a write power Pw, since the arrangement is to perform an irradiation using a laser beam having a power level P1 lower than a read power Pr, it is possible to minimize an influence from a remaining heat (even when a long recording mark has been formed), and to leave a space until a next recording mark as a clean non-recorded portion. Furthermore, even in the case where a write power Pw has been set large in order to form the shortest recording mark in a shape close to a true circle, it is still possible to effectively eliminate the influence from the remaining heat and to leave a space until a next recording mark as a clean non-recorded portion.

Although the recording layer 18 comprises the first and second sub recording layers 18A and 18B, it is also possible for the recording layer to comprise three or more sub recording layers, and allow any one of the sub recording layers to be located on the incident light side, provided that the recording layer comprises at least two sub recording layers. Further, the first and second sub recording layers 18A and 18B forming the recording layer 18 are allowed to contain only main component metals, or other additional elements besides main component metals. Moreover, although the above embodiment showed that the recording layer 18 is formed such that the first sub recording layer 18A and the second sub recording layer 18B are in direct contact with each other, it is also allowed to interpose an intervening layer containing other elements as its main component between the two sub recording layers.

The above embodiment shows that when information is recorded in detail in the optical recording medium 10, the wavelength of the laser beam is set at a blue wavelength of 405 nm. However, it is also possible for the wavelength to be set equal to or shorter than such a wavelength. Rather, it is allowed to say that only when a high speed recording is conducted under such a condition, it is possible to make full use of the advantages of the present invention. On the other hand, it has also been confirmed that even when using a laser beam having a red wavelength level which is longer than a blue wavelength level, it is still possible to obtain the predetermined advantages of the present invention (in detail, using a laser beam having a wavelength range of 200 nm to 700 nm). Therefore, for example, if it is desired to realize a further lower cost, it is possible for the present invention to be applied to a laser irradiation system using a red wavelength.

EXAMPLE 1

Example of Al/Sb

An optical recording medium was produced in accordance with an arrangement shown in FIG. 1, and an evaluation was conducted concerning a high-density and high-speed recording.

A polycarbonate substrate of 1.1 mm, having grooves whose track pitch was 0.32 μm and groove width was 0.13 μm, was used to form the support substrate 12, while the thickness of the light transmitting cover layer 22 was set at 100 μm.

Other layers were produced by sputtering under the following condition.

Electrostatic layer: $ZnS+SiO_2$ (80:20 mol %)
First dielectric layer 20: 60 nm
Second dielectric layer 16: 105 nm
First sub recording layer 18A: AlCr (98:2 at. %) 4 nm
Second sub recording layer 18B: Sb 6 nm
Reflection layer 14: AgPdCu (98:1:1 at. %) 100 nm The shortest mark (2T) was changed, random signals were recorded, and evaluation was carried out with playback Jitter value, all by using an evaluation apparatus whose laser beam has a wavelength of 405 nm and whose objective lens group has a numerical aperture NA of 0.85, and by changing the recording linear velocity with an equivalent for 70 Mbps ((1, 7) RLL modulation manner, channel clock 132 MHz fixation, format efficiency 80%).

A multi-pulse strategy used in recording is an (n-1) type strategy, with 2T recorded by 1 pulse of FP (first pulse), 5T recorded by 3 pulses of FP and MP (multi-pulse), thus recording by a total of 4 pulses.

A strategy having a shape shown in FIG. 2A was used, with Pr=Pb: 0.5 mW and Pw: 6.0 mW, and with the respective lengths of pulses being TFP: 0.3T (0.15), TMP: 0.25T, and T1: 1T (0.5) (proportions with respect to the shortest mark length).

At this time, P1 is set at 0.1 mW and 0.5 mW (P1=Pr comparative example), using the clock Jitter value of a signal to perform an evaluation, with the evaluation result shown in Table 1.

| Recording linear velocity (m/s) | Longest mark length (nm) | Jitter (%) P1 0.5 mW | Jitter (%) P1 0.1 mW |
|---|---|---|---|
| 11.4 | 173 | 7.3 | 6.9 |
| 10.6 | 161 | 8.1 | 7.5 |
| 10.3 | 156 | 9.3 | 8.1 |
| 10.0 | 152 | 10.6 | 8.8 |

It is understood that by using a recording strategy of irradiating for a predetermined time with a power level P1 which is lower than a read power, it is possible to reduce the Jitter value and improve signal characteristics. Also, it is understood that this difference is particularly remarkable when the shortest mark length is shortened and used as a high recording density.

A sample recording layer, on which 2T (shortest mark) and a single signal of space have been recorded at 10.6 m/s, was stripped from the substrate and the cover layer, followed by observing the shape of recording mark by means of TEM. The width of recording mark was found to have reached 150 nm (about 0.9 times with respect to the recording mark length), with the mark being close to a true circle.

A recording strategy having a shape shown in FIG. 2(D) was used to perform an evaluation of recording marks on the same sample.

Under a condition in which P2=Pb is 1 mW, P1 is 0.1 mW, and the respective lengths of pulses and other parameters are the same as those described above, random signals were recorded at a recording linear velocity of 10.6 m/s and then an evaluation was conducted.

It was found that an optimum write power had dropped to 5.0 mW (Jitter 7.6%) and the recording sensitivity had been improved 1.0 mW from 6.0 mW.

EXAMPLE 2

Example of Si/Cu

An optical recording medium was produced in accordance with the arrangement shown in FIG. 1, followed by an evaluation on a high speed and high density recording, using the same manner as Example 1.

The support substrate and light transmitting cover layer were made the same as those in Example 1.

Other layers were produced by sputtering under the following condition.

Electrostatic layer: $ZnS+SiO_2$ (80:20 mol %)
First dielectric layer 20: 22 nm
Second dielectric layer 16: 28 nm
First sub recording layer 18A: Si 5 nm
Second sub recording layer 18B: Cu 6 nm
Reflection layer 14: AgPdCu (98:1:1 at. %) 100 nm The shortest mark (2T) was changed, random signals were recorded, and the playback Jitter value was evaluated, all by using an evaluation apparatus whose laser beam has a wavelength of 405 nm and whose objective lens group has a numerical aperture NA of 0.85, and by changing the recording linear velocity with an equivalent for 35 Mbps ((1, 7) RLL modulation manner, channel clock 66 MHz fixation, format efficiency 80%).

A strategy having a shape shown in FIG. 2A was used, with Pr=Pb: 0.5 mW and Pw: 5.0 mW, and with the respective lengths of pulses being TFP: 0.3T (0.15), TMP: 0.25T, and T1: 1T (0.5) (proportions with respect to the shortest mark length).

Similar to Example 1, P1 is set at 0.1 mW and 0.5 mW (P1=Pr comparative example), and using the clock Jitter value of a signal an evaluation was performed with the evaluation result shown in Table 2.

TABLE 2

| Recording linear velocity (m/s) | Longest mark length (nm) | Jitter (%) P1 0.5 mW | Jitter (%) P1 0.1 mW |
|---|---|---|---|
| 5.7 | 173 | 7.9 | 7.4 |
| 5.3 | 161 | 8.4 | 7.8 |
| 5.0 | 152 | 11.1 | 9.1 |

It is understood that by using a recording strategy of irradiating for a predetermined time with a power level P1 which is lower than a read power, it is possible to reduce the Jitter value and improve signal characteristics, as in Example 1. Also, it is understood that this difference is particularly remarkable when the shortest mark length is shortened and used as a high recording density.

INDUSTRIAL APPLICABILITY

According to the present invention, it is possible to perform a recording at a high speed. Further, since it is possible to clearly maintain an edge portion of mark/space, which becomes a problem when trying to realize a high density in a high speed recording, it is possible to compensate for a recording sensitivity decrease occurring in a high speed recording. Moreover, by adjusting a maintaining time having a low power level, it is possible to better handle a high speed recording as well as a low speed recording.

The invention claimed is:

1. A recording method for a write-once optical recording medium, comprising following steps of:
   irradiating a first laser beam having a predetermined write power Pw onto the write-once optical recording medium for forming a certain recording mark, and then
   irradiating a second laser beam having a power level P1 lower than a read power Pr set for reading the recording marks for a predetermined time,
   wherein a wavelength of the first and second laser beams is set to 450 nm or shorter, and a transfer rate of the first and second laser beams is set to 35 Mbps or higher.

2. The recording method for a write-once optical recording medium, according to claim 1, wherein
   before the first laser beam having the write power Pw is irradiated, a third laser beam having a power level P2 higher than the read power Pr and lower than the write power Pw is irradiated.

3. The recording method for a write-once optical recording medium according to claim 1, wherein
   after the second laser beam having the power level P1 is irradiated,
   a third laser beam having a power level P2 higher than the read power Pr and lower than the write power Pw is further irradiated.

4. The recording method for a write-once optical recording medium according to claim 1, wherein
   at least a length of a shortest recording mark among the recording marks is less than 0.35 times the spot diameter of the laser beam.

5. The recording method for a write-once optical recording medium according to claim 1, wherein
   at least a width of the shortest recording mark among recording marks is 0.7 times or more the length of the shortest mark.

6. A write-once optical recording medium, comprising
   a laminated recording layer containing at least two sub recording layers each containing one kind of metal as its main component, wherein
   the laminated recording layer is to be irradiated at least with dual laser beams each having a predetermined recording strategy so that the main component metals contained in the respective sub recording layers are diffused and mixed together so as to be recordable recording marks,
   the recording strategy comprises a configuration such that a first laser beam of the dual laser beams having a write power Pw is irradiated for forming a certain recording mark, and then a second laser beam of the dual laser beams having a power level P1 lower than a read power Pr set for reading the recording marks is irradiated for a predetermined time, and
   a wavelength of the first and second laser beams is set to 450 nm or shorter, and a transfer rate of the first and second laser beams is set to 35 Mbps or higher.

7. The write-once optical recording medium according to claim 6, wherein
   one of the sub recording layers contains as its main component metal one element selected from the group comprising Al, Ag, Au, and Cu.

8. The write-once optical recording medium according to claim 6, wherein
   at least a length of a shortest recording mark among the recording marks is less than 0.35 times the spot diameter of the laser beam.

* * * * *